UNITED STATES PATENT OFFICE 2,642,345

ALKALI METAL DISPERSIONS AND THEIR USE AS DIESEL FUEL ADDITIVES

Harris W. Bradley and Herbert K. Livingston, Wilmington, Del., assignors to E. I. du Pont de Nemours & Company, Wilmington, Del., a corporation of Delaware No Drawing. Application July 15, 1950, Serial No. 174,126

10 Claims. (Cl. 44—51)

This invention relates to an improved type of alkali metal dispersions in inert hydrocarbons and to their use as additives for diesel fuels. In particular, it relates to dispersions whose reactivity towards water has been substantially reduced thereby substantially decreasing the hazards attending their handling and use.

Finely divided alkali metals dispersed in inert liquids such as hydrocarbons are useful materials for many purposes but their commercial use has been limited by their extreme reactivity towards water, which frequently leads to firing of the dispersed metal on contact with water. This is a particularly serious problem when considering the use of finely divided alkali metal dispersions in the petroleum industry where great care must be exercised to avoid fires.

U. S. Patent 2,209,746 discloses dispersions in the form of pastes of alkali metals in viscous polybutadiene or polyisobutylene. Such pastes, which contain up to 20% of dispersed metal, do not burn on contact with water. However, the polymers used in making the pastes dissolve in hydrocarbon liquids and afford no worth-while protection to the dispersed metal when the dispersions are added to or diluted with hydrocarbon liquids. Therefore, such products have little or no value as additives to hydrocarbons such as diesel fuels, since the protective action of the polymer disappears when they are added to the hydrocarbon fuel.

It is an object of the present invention to provide an improved type of alkali metal dispersions. A further object is to provide dispersions which are relatively unreactive towards water even though the metal be dispersed in hydrocarbon liquids. A still further object relates to the use of the present improved dispersions as diesel fuel additives. Other objects will be apparent from the following description of the invention.

The above objects are accomplished in accordance with the invention by incorporating an ethylene polymer of molecular weight of at least 588 into a dispersion or emulsion of the alkali metal in an inert hydrocarbon liquid at a temperature such that the polymer is dissolved in the hydrocarbon liquid, and then cooling the resulting mixture. Incorporation of the polymer may be effected either during or after the formation of the dispersion. The amount incorporated should be so chosen that the polymer will be insoluble in the hydrocarbon liquid, hereinafter referred to as the dispersing liquid, at ordinary temperatures, i. e., at temperatures below about 40° C. It has been discovered that products prepared in this manner are relatively highly unreactive towards water and may be handled and used much more safely than corresponding products into which no polymer of the present type has been incorporated. The relative inertness towards water of the present dispersion products makes practical their use as additives for diesel fuels.

Ethylene polymers of molecular weight of about 588 or higher are soluble in hydrocarbon liquids at temperatures of, for example, 100 to 150° C., at which sodium dispersions are ordinarily prepared, but are insoluble in such liquids and separate therefrom, frequently in the form of crystals, at temperatures below the melting points of the ethylene polymer, with the separated polymer having a water-resistant or protective action on the dispersed metal particles. Accordingly, incorporation of the ethylene polymer into the alkali metal dispersion should be effected at a temperature above the melting point of the polymer, and the resulting mixture, after thorough distribution of the polymer in the mixture, is then cooled to a temperature below the melting point of the polymer, e. g., to ordinary temperature.

The melting point of ethylene polymers represents a phase transition in the true sense of the word, but the polymers above their melting points are not conventional liquids because of their high molecular weights (see Ind. Eng. Chem., 37, 526). As pointed out in this reference, the marked increase in hydrocarbon solubility of ethylene polymers at 80 to 100° C. is probably due to this phase transition from crystalline solids to high molecular "liquids."

The melting of ethylene polymers has been discussed in detail by Richards, Trans., Faraday Soc. 41, 127. The melting point and crystallinity of any given polymer was shown to depend on the average molecular weight, molecular weight distribution, molecular structure, content of low molecular weight material, and previous thermal history, i. e., the extent and rate of heating or cooling, of the polymer.

Insofar as is now apparent it does not appear likely that any polymer of ethylene would be too high melting to be useful for the purpose of this invention, since the highest value observed by Richards in the above article, i. e., 126° C., is well within the range of temperatures used, for example, in the preparation of sodium dispersions. The practical limit on the lower value of the molecular weight is that the polymer when mixed in concentrations of 20% or more with the dispersing liquid should not be liquid at ordinary atmospheric temperatures, i. e., temperatures below about 40° C. From the data given by Richards, this would indicate a minimum molecular weight somewhat below 650, which is consistent with the results of our tests.

The importance of molecular weight distribution of ethylene polymers useful for practicing the present invention can be judged from a consideration of the effect of molecular weight on the melting point of the polymers. As has been shown by Richards in the above article, this effect is slight unless the polymer contains a considerable concentration of low molecular weight material.

Increased chain branching lowers the melting point of ethylene polymers. However, it has been found that a polymer deliberately treated so as to increase chain branching is still satisfactory for the purposes of this invention and it appears that any ethylene polymer would be satisfactory in which the molecular weight of the longest straight chain is at least 588, which corresponds to 21 ethylene monomer units or a straight chain of 42 carbon atoms.

The ratio of ethylene polymer to dispersing liquid to be used in preparing water-resistant dispersions in accordance with the invention will depend upon the melting point, molecular weight, molecular structure of the polymer used and the degree of protection desired. The primary requirement, as indicated above, is that the polymer be hydrocarbon insoluble at ordinary temperatures. The ratio of polymer to dispersing liquid will in general vary from 1:16 to 1:1 or over even wider limits. Other things being equal, the minimum amount of ethylene polymer that can be used increases with decreasing molecular weight. However, the amount used must always be sufficient to insure the presence of solid polymer at temperatures of below about 40° C.

The amount of polymer to be used for any given amount of alkali metal in the dispersion of course depends upon the degree of protection desired. No great difference was observed between dispersions prepared having a polymer: sodium ratio of 1:1 and 1:5.3. Excellent results are obtained using ratios within this range, although ratios as low as 1:12 and even 1:25 have been used successfully. The ethylene polymer may also be present in excess over the alkali metal, the only limit to the amount of excess polymer being the concentration of the metal which is necessary or desired for the intended use of the product. In general, the ratio of ethylene polymer to alkali metal, on a weight basis, will be within the range 1:25 to 10:1, the preferred range being 1:15 to 1:1.

The ratio of ethylene polymer to solvent should be maintained within the range indicated above during the preparation of the dispersion. However, upon completion of the dispersion and the cooling thereof to a temperature below that at which separation of solid polymer upon the dispersed metal particles occurs, the resulting protected dispersion may then be diluted more or less indefinitely by the addition of inert hydrocarbon liquid or by the addition of the dispersion to such a liquid, without impairment to any substantial extent of the protective action of the polymer upon the metal particles, so long as the temperature is maintained below the melting point of the polymer and the storage period for the diluted mixture is not excessively long, e. g., not over a few weeks.

In the preparation of the present protected dispersion compositions, the alkali metal content of the dispersion which is treated with the ethylene polymer may be any desired value although for practical purposes concentrations exceeding about 65% by weight ordinarily will not be used since such high concentrations give mixtures which are not sufficiently fluid for proper processing. It is preferred ordinarily that the alkali metal concentration be within the range 20 to 65% by weight although concentrations lower than this amount may be used if desired. As has been indicated previously the ratio of polymer to alkali metal generally should be within the range 1:25 to 10:1 so that the metal concentration will generally, although not necessarily, be chosen so as to form a final product having a polymer to metal ratio within this range.

After the protected dispersion has been prepared, it may be diluted further with inert hydrocarbon liquids in instances where products having a low alkali metal content are desired. Thus, diesel fuels containing small concentrations of alkali metals have been found to possess improved ignition characteristics and such improved fuels may be obtained conveniently and practically by adding to the fuel such amount of a protected dispersion prepared as indicated above as is necessary to give the desired small concentration of alkali metal in the final fuel product.

Diesel fuels containing dispersed alkali metal particles of 100 microns in diameter or less, which metal particles are protected by the presence of an ethylene polymer in an amount corresponding to a polymer to metal ratio of 1:25 to 10:1, and preferably 1:15 to 1:1, have been found to be highly useful. Such fuels have remarkably high cetane numbers if they contain an amount of active alkali metal, i. e., alkali metal capable of liberating hydrogen from hydroxyl groups, of the order of one part per thousand of fuel. Furthermore, such fuel products are substantially more stable and safer to work with than are comparable fuels containing finely divided alkali metal without protective agents. Alkali metal concentrations greater than about 0.5% by weight are not especially desirable in such fuels since such greater amounts do not further improve the cetane number. Metal concentrations as low as 0.001% give a useful cetane number increase. The preferred concentration is 0.01% to 0.2%.

The hydrocarbon dispersing liquid employed should of course be non-reactive towards the alkali metal and should have a boiling point above the temperature at which the dispersion product is prepared. Dispersing liquids having a boiling point below such temperature may be used provided operations are carried out under pressure. High-flash solvents such as white oil, mineral oils, or refined diesel fuels are preferred dispersing liquids because of the lesser fire hazard resulting from their use; however, toluene, xylene or naphtha may also be used. Useful dispersion products which contain little or no hydrocarbon dispersing liquid can be made by distilling a relatively-volatile solvent, such as xylene from a cool dispersion under reduced pressure.

The particle size desired in the alkali metal dispersions of the present invention will depend upon the use to which the dispersion is to be put. In general, it is desirable that all metal particles be below 100 microns in diameter with the average particle diameter being not more than about 25 microns. The dispersed metal in diesel fuel compositions preferably will have an average particle diameter of not more than 10 microns and preferably of the order of 3 microns or less, although coarser dispersions can be used successfully. Various dispersing agents are known, the use of which facilitate the obtainment of alkali metal dispersions in which the alkali metal is present in extremely finely divided form. Among the agents which are useful for the production and/or stabilization of finely divided alkali metal particles in such dispersions are: the alkali metal soaps of higher fatty acids used either alone, as described in Patent 2,394,608, or in combination as an adsorption complex with active carbon, as described in Patent 2,487,333; the hydroperoxides of Patent 2,487,334; the alkali metal alcoholates of certain alcohols as disclosed in the application of Livingston, S. N. 173,985, filed July 15, 1950; or the complex addition compounds formed between the alkali metal cleavage products of certain ethers as disclosed by Hansley and Hilts in application S. N. 81,874, filed March 17, 1949, now Patent 2,579,257. Although the use of such agents is not necessary in the practice of the present invention, their presence in the present products is desirable since they permit the obtainment of final products in which the dispersed metal is extremely finely divided. When such agents are employed, it is preferred that they be added to the alkali metal-dispersing liquid mixture prior to the addition of the ethylene polymer, and that emulsification of the metal in the liquid be effected by means of suitable agitation as described in the above patents before the ethylene polymer be added. After addition of the polymer, further agitation of the mixture to effect uniform distribution of the polymer throughout the mixture is of course desired.

The present protected alkali metal dispersions are useful for any purpose where a dispersion protected against the action of water is desired. They are particularly useful as additives for diesel fuels of inferior ignition characteristics. The accepted index for the ignition quality of diesel fuels is the cetane number, the higher the cetane number the more readily the fuel ignites on compression. With the increasing use of diesel engines for the generation of power, there is a great demand for hydrocarbon fuels having ignition characteristics that will permit their use in a compression-ignition, i. e., diesel, cycle without excessive time lag in ignition. Modern, high-speed diesel engines will not operate smoothly with a slow-ignition fuel. Excessive ignition lag leads to incomplete and inefficient combustion, rough running, and heavy smoke formation. There is, therefore, a great need for effective and economical ignition accelerators that will permit the use as diesel fuels of petroleum distillates, such as the gas oil fractions which are not now satisfactory for this use because of their inferior ignition quality. As is shown in the examples, a small amount, such as one part per thousand, of alkali metal greatly decreases the ignition delay of diesel fuels as indicated by the A. S. T. M. cetane number. The addition of sodium or other alkali metal in the present safe, finely divided form to a fuel having excessive ignition delay makes it possible to operate a high speed diesel engine with this fuel under conditions where the time available in each compression stroke would not be sufficient to cause ignition of the fuel at the right point in the stroke, if the alkali metal had not been added.

The invention is further illustrated by the following examples.

*Example 1*

600 g. of heavy mineral oil (U. S. P.) was placed in a dispersing equipment of the type described in Hansley Patent 2,394,608 and heated to 130° C. 90 g. of an ethylene polymer having an average molecular weight of about 8,700 was added and the pump started. When the mixture was homogeneous, 480 g. of solid sodium was added at such a rate that the temperature did not fall below 120° C. One hour after all the sodium had been added, the pump was stopped and the emulsion was withdrawn and allowed to cool. During this hour, the temperature had been maintained at 120 to 130° C.

The product dispersion was a soft paste having no tendency to flow under its own weight. It contained spherical sodium particles 12–100 microns in diameter and, as a continuous phase, a gel-like mass of ethylene polymer and oil. On dilution of the dispersion with a dry oil such as cetane to a sodium concentration of 0.1–0.5%, the polymer molecules remained in microcrystalline aggregates on or near the sodium surface. When the progress of a drop of water into the oil was observed under the microscope, it was seen that the particles of ethylene polymer surrounding the sodium particles tended to protect the latter from attack by the water. This effect was permanent enough to show that such sodium-containing fuels can be stored for at least several weeks.

A portion of the above product was placed in a closed flask with dry cetane and the volume of hydrogen liberated when a known volume of octanol was added indicated a sodium concentration of 210 g. per kg. of dispersion. This was lower than the average concentration of the dispersion and represents a portion of the sample which lost in sodium concentration due to settling. 8 g. of this dispersion was added to one liter of Venezuelan straight-run gas oil. The cetane number of the resultant fuel, determined by the A. S. T. M. method, was 76, whereas the original gas oil had a cetane number of 48.

*Example 2*

800 g. of heavy mineral oil (U. S. P.) was heated in the dispersion equipment referred to in Example 1 and 80 g. of the same ethylene polymer was added. The pump was used in the same way and the temperature was controlled at 120–130° C. while 80 g. of sodium was added. The emulsion was withdrawn one hour later and allowed to cool.

The above product, a viscous dispersion of sodium in the oil, could be poured directly into water without violent hydrogen evolution, smoking, or firing. The protective action of the ethylene polymer remained when this product was diluted with diesel-type fuel oil to a sodium concentration of about 0.1%.

The particle size of the original dispersed sodium ranged from 12 to 100 microns. Analysis by the method described in Example 1 indicated a sodium content of 70 g. per liter. 14 cc. of this dispersion raised the A. S. T. M. cetane number of one liter of Venezuelan gas oil from 48 to 64.

*Example 3*

640 g. of heavy mineral oil (U. S. P.) and 480 g. of sodium were mixed in the dispersing equipment referred to in Example 1. The procedure was the same as there described except that 40 g. of a polymer of the type described by Hahn et al., Ind. Eng. Chem. 37, 526, having a molecular weight of approximately 25,000 was used, and 4 g. of oleic acid was added as a stabilizing agent at the same time that the sodium was added.

The product obtained was a soft paste having no tendency to flow under its own weight. The sodium particles were 2-40 microns in diameter. Addition of 3.4 g. of a portion of the dispersion containing 300 mg. of sodium per gram, by analysis, to one liter of a Venezuelan gas oil raised the A. S. T. M. cetane number of the fuel from 48 to 57.

*Example 4*

A linear, high molecular weight ethylene polymer similar to that used in Example 3 was heated in a high-pressure bomb with sodium, toluene and ethylene to produce an ethylene polymer with a high proportion of branched chains. This polymer was then used to increase the water-resistance of a sodium dispersion as follows:

400 cc. of heavy mineral oil (U. S. P.) was placed in the dispersion equipment described in Hansley Patents 2,487,333 and 2,487,334 and warmed to 110° C. 80 g. of the ethylene polymer was added and after it had melted the pump was started and 225 g. of solid sodium was added slowly. After 30 minutes, 3 cc. of oleic acid was also added. After 90 minutes, the emulsion was removed and cooled. During the entire emulsification step the temperature was held at 110–115° C.

Upon dilution of a portion of the above product with a large excess of dried cetane, it was found to contain spherical sodium particles uniformly coated with a layer of amorphous ethylene polymer. The sodium particles were about 0.1 to 1.5 microns in diameter. The dispersion was a soft paste which did not flow under its own weight. It could be added to water without any reaction execept for the liberation of a small amount of hydrogen. A mixture of 1 g. of this dispersion, 250 cc. cetaine and 250 cc. isooctane had an A. S. T. M. cetane number of 59 as compared to 55 for the cetane-isooctane mixture alone.

*Example 5*

To 500 c. of heavy mineral oil (U. S. P.) was added 50 g. of an ethylene polymer having a molecular weight of 10,000. The mixture was heated in the equipment referred to in Example 4 and 285 g. of solid sodium was added at 110–115° C. The resulting mixture was held at this temperature while pumping for 1½ hours. The resulting product on dilution with dried cetane was found to contain sodium particles of 2-15 microns in diameter surrounded by microcrystalline particles of ethylene polymer. The cooled dispersion, which was a thick paste, could be left in water for 24 hours without more than 10% of the sodium reacting.

*Example 6*

285 g. of sodium was emulsified in 500 cc. of heavy mineral oil (U. S. P.) at 115–125° C. using the equipment referred to in Example 4. After 30 minutes, 50 g. of an ethylene polymer having a molecular weight of 7,500 was added and the pumping continued for 90 minutes at 115–125° C. The product was removed and allowed to cool. A portion of it was placed in water and was found to be virtually unreacted, i. e., no reaction except for a very thin surface layer, after 24 hours in water at room temperature.

*Example 7*

100 g. of ethylene was shaken with 5 g. of calcium and 50 g. ammonia in a high-pressure bomb at 250° C. and 900 atmospheres. After polymerization was complete, a soft, waxy polymer having a molecular weight of approximately 600 was obtained. This polymer was used to increase the water-resistance of a sodium dispersion by heating a mixture of 66 g. of heavy mineral oil (U. S. P.), 50 g. of sodium and 55 g. of the polymer to 110° C. on a hot plate and emulsifying the mixture by means of an Eppenbach Homo-mixer for five minutes at 100–120° C. The product, which contained sodium particles of 3–30 microns in diameter and crystals of ethylene polymer smaller than 1 micron, was a soft paste which did not flow under its own weight. It reacted only very slowly with water. A mixture of 1 g. of this dispersion, 250 cc. of cetane, and 250 cc. of isooctane had an A. S. T. M. cetane number of 59, as compared to 55 for the cetane-isooctane mixture alone.

*Example 8*

To 500 cc. of heavy mineral oil (U. S. P.) was added 285 g. of sodium and 3 g. of 2-methyl-2-nonadecanol (used as a dispersing agent). An emulsion was made employing the equipment referred to in Example 4. 90 g. of an ethylene polymer having a molecular weight of 12,500 was then added. After a uniform dispersion was effected by agitation, the product was removed.

The cooled product was a somewhat non-coherent solid which did not fire on addition to water. On dilution with dried cetane, the sodium particles of 3–100 micron in diameter were found to have an appreciable number of sub-micron crystals of ethylene polymer adhering to the surface. Some sodium particles had no adhering crystals and some crystals of ethylene polymer were free of the sodium surface. A mixture of 1 g. of this dispersion, 250 cc. of cetane and 250 cc. of isooctane had a cetane number of 60 as compared to 55 for the cetane-isooctane mixture alone.

*Example 9*

To 500 cc. of xylene was added 285 g. of sodium and 3 cc. of oleic acid, using the equipment referred to in Example 4. After emulsification was effected at 110–120° C., 80 g. of an ethylene polymer having a molecular weight of 11,200 was added. After the polymer was thoroughly dissolved and distributed, the mixture was removed and allowed to cool. The product was a rather firm solid consisting of sodium particles of an average particle size of about 25 microns in a continuous phase consisting of a polymer-xylene gel. The dispersion had a strong xylene odor but had much less tendency to fire on contact with water than an unprotected sodium-in-xylene dispersion. Microscopic examination of a portion of the product diluted with a large excess of dried xylene revealed that many of the sodium particles had polymer crystals on their surface. A mixture of 1 g. of the dispersion of this example with 250 cc. of cetane and 250 cc. of isooctane had an A. S. T. M. cetane number of 60.5 as compared to 55 for the cetane-isooctane mixture alone.

*Example 10*

To 600 g. of heavy mineral oil (U. S. P.) was added, in turn, 90 g. of the polymer described in Example 1, 480 g. of sodium, 4 g. oleic acid, and 10 g. of anisole (a dispersing agent). Dispersion of the sodium in the mixture was accomplished as described in Example 1. One portion of the resulting product was analyzed as in Example 1 and found to contain 190 g. of sodium per kg. of dispersion. The particle size of the dispersed sodium was 3 to 30 microns, and the product was a soft paste having no tendency to flow under its own weight. It reacted only very slowly and did not fire on mixing with water. 5.6 g. of this dispersion added to one liter of straight run Venezuelan gas oil, raised the A. S. T. M. cetane number from 48 to 64.

In place of sodium, as illustrated in the above examples, the present invention may be practiced employing any alkali metal, such as lithium, potassium, rubidium, caesium, or any alloy of two or more alkali metals.

As indicated previously, any ethylene polymer containing at least 21 ethylene units in the longest straight chain, i. e., having a molecular weight of about 588 or higher, may be used in practicing the invention. The order of addition of the various materials used in preparing the emulsion is not of prime importance and as indicated in the above Hansley patents, preparation of the dispersions may be accomplished employing any type of equipment which will provide agitation effective to comminute the metal to the desired degree of fineness. It may be stated that while the crystallinity of the ethylene polymer in the cooled product will depend to some extent on the rate of cooling, little change in crystallinity occurs below about 60° C. However, the crystal structure may be "quenched" at any desired state by rapid cooling to this temperature or preferably a temperature below about 40° C.

We claim:

1. A composition consisting essentially of a dispersion of an alkali metal in an inert hydrocarbon liquid and containing an ethylene polymer having a straight carbon chain of a length corresponding to a molecular weight of at least 588 in an amount in excess of the solubility of said polymer in said liquid at a temperature lower than about 40° C., said composition containing 0.001 to 65% by weight dispersd alkali metal as particles of a size not exceeding 100 microns in diameter, the weight ratio of said polymer to said metal in said composition being within the range 1:25 to 10:1, and the weight ratio of said polymer to said hydrocarbon liquid being not in excess of 1:1.

2. A composition according to claim 1 wherein the weight ratio of polymer to liquid is in the range 1:1 to 1:16.

3. A composition according to claim 2 which contains 20 to 65% by weight alkali metal.

4. A composition according to claim 2 wherein the particle size of dispersed metal particles is less than 100 microns in diameter and the weight ratio of polymer to alkali metal is within the range 1:25 to 10:1.

5. A composition according to claim 2 wherein the average particle size of the dispersed metal particles is not greater than about 25 microns in diameter and the weight ratio of polymer to alkali metal is within the range 1:15 to 1:1.

6. A composition according to claim 2 wherein the alkali metal is sodium.

7. A fuel for compression-ignition engines of the diesel type consisting essentially of a hydrocarbon fuel and containing 0.001 to 0.5% by weight of finely divided alkali metal dispersed therein as particles of a size not exceeding 100 microns in diameter and an ethylene polymer having a straight carbon chain of a length corresponding to a molecular weight of at least 588, the weight ratio of said polymer to metal being within the range 1:25 to 10:1.

8. A fuel according to claim 7 wherein the content of alkali metal is 0.01 to 0.2%.

9. A fuel according to claim 7 wherein the average particle size of the dispersed metal particles is not greater than about 25 microns in diameter and the weight ratio of polymer to metal is 1:15 to 1:1.

10. A fuel according to claim 7 wherein the alkali metal is sodium.

HARRIS W. BRADLEY.
HERBERT K. LIVINGSTON.

References Cited in the file of this patent

UNITED STATES PATENTS

| Number | Name | Date |
| --- | --- | --- |
| 2,394,608 | Hansley | Feb. 12, 1946 |
| 2,487,334 | Hansley | Nov. 8, 1949 |